United States Patent
Men et al.

(10) Patent No.: US 8,609,577 B2
(45) Date of Patent: Dec. 17, 2013

(54) CATALYST FOR STEAM REFORMING OF METHANOL

(75) Inventors: Yong Men, Dalian (CN); Ralf Zapf, Mainz (DE)

(73) Assignee: Institut fuer Mikrotechnik Mainz GmbH, Mainz (DE)

( * ) Notice: Subject to any disclaimer, the term of this patent is extended or adjusted under 35 U.S.C. 154(b) by 0 days.

(21) Appl. No.: 13/501,543

(22) PCT Filed: Oct. 7, 2010

(86) PCT No.: PCT/EP2010/065041
§ 371 (c)(1),
(2), (4) Date: Apr. 12, 2012

(87) PCT Pub. No.: WO2011/047968
PCT Pub. Date: Apr. 28, 2011

(65) Prior Publication Data
US 2012/0207667 A1    Aug. 16, 2012

(30) Foreign Application Priority Data
Oct. 19, 2009   (DE) .......................... 10 2009 045 804

(51) Int. Cl.
*B01J 23/00* (2006.01)

(52) U.S. Cl.
USPC ....................................................... 502/325

(58) Field of Classification Search
USPC ....................................................... 502/325
See application file for complete search history.

(56) References Cited

U.S. PATENT DOCUMENTS

| | | | |
|---|---|---|---|
| 4,522,935 A * | 6/1985 | Robinson et al. | 502/223 |
| 6,413,449 B1 | 7/2002 | Wieland et al. | |
| 6,849,573 B2 * | 2/2005 | Haga et al. | 502/329 |
| 2005/0113251 A1 | 5/2005 | Lowe et al. | |
| 2005/0288538 A1 * | 12/2005 | Lowe et al. | 585/259 |

FOREIGN PATENT DOCUMENTS

| | | |
|---|---|---|
| DE | 4333343 A1 | 4/1994 |
| DE | 10010007 A1 | 12/2000 |
| EP | 1312412 A2 | 5/2003 |

OTHER PUBLICATIONS

Iwasa, N. et al.; "New Catalytic Functions of Pd-Zn, Pd-Ga, Pd-In, Pt-Zn, Pt-Ga, and Pt-In Alloys in the Conversions of Methanol"; Catalysis Letters, Springer, Dordrecht; NL, vol. 54, No. 3, Sep. 1, 1998, pp. 119-123, XP000783437, ISSN: 1011372X, DOI: DOI:10.1023/A:1019056728333 cited in the application.

* cited by examiner

Primary Examiner — Colleen Dunn
Assistant Examiner — Haytham Soliman
(74) Attorney, Agent, or Firm — Michael L. Dunn

(57) ABSTRACT

A catalyst for steam reforming of methanol, which includes a carrier material comprising a metal oxide and deposited thereon
 a) indium oxide ($In_2O_3$) and at least one further metal from the group of palladium (Pd), platinum (Pt), rhodium (Rh) and iridium (Ir) and/or
 b) an alloy comprising indium and at least one further metal from the group of palladium (Pd), platinum (Pt), rhodium (Rh) and iridium (Ir),
as catalytically active substances.

10 Claims, 4 Drawing Sheets

CATALYST FOR STEAM REFORMING OF METHANOL

CROSS REFERENCE TO RELATED APPLICATIONS

This is a United States Nationalization of International Patent Application PCT/EP2010/06541 filed Oct. 7, 2010 which claims priority from German Patent Application 10 2009 045 804.2 filed Oct. 19, 2009.

BACKGROUND OF THE INVENTION

The present invention concerns a catalyst for steam reforming of methanol, the production of the catalyst according to the invention and the use thereof.

In the steam reforming of methanol, on the catalyst according to the invention, methanol (MeOH) and steam ($H_2O$) are converted on the catalyst to give carbon dioxide ($CO_2$) and hydrogen ($H_2$) in accordance with the following reaction:

$$CH_3OH + H_2O \rightarrow CO_2 + 3H_2 \qquad (i)$$

The division of methanol into carbon monoxide (CO) and hydrogen occurs as a secondary reaction:

$$CH_3OH \rightarrow CO + 2H_2 \qquad (ii)$$

The production of hydrogen as an energy carrier is ever increasing in importance because of the decreasing availability of fossil fuels and for ecological and economic reasons. Obtaining energy from hydrogen by combustion in fuel cells is one of the most important applications.

The production of hydrogen from methanol by steam reforming of methanol is effected in a methanol reformer which can either be used in a static mode or in a mobile mode. In the methanol reformer a methanol-water mixture with a water-methanol ratio of between about 1.3 and 1.5 is compressed to up to 20 bars, evaporated, superheated to between about 250 and 280° C. and converted in accordance with the above-indicated reactions. The hydrogen is separated off by means of a hydrogen-permeable membrane catalytically or by pressure swing adsorption.

Mobile methanol reformers are used for example as mobile hydrogen sources for fuel cells in order not to have to carry the hydrogen in pressure gas tanks for safety reasons. Methanol has the advantage, as the starting material for mobile hydrogen production, that it can be carried along in the form of a liquid fuel and is thus safer than hydrogen although methanol is also not completely harmless to handle by virtue of its toxic nature and combustibility. Because of its high hydrogen-carbon ratio and its low sulfur content methanol is also highly suitable as a hydrogen source and can be produced from renewable sources such as for example biomass in environmentally fashion and independently of fossil fuel sources.

Two basic demands on a catalyst are a high catalytic activity and high selectivity in respect of the desired product or products. In the steam reforming of methanol a high catalytic activity is demonstrated by high conversion rates, in particular at temperatures which are as low as possible. Good selectivity of a catalyst for steam reforming of methanol is distinguished in that the product of the reaction of methanol and water in accordance with the desired primary reaction (i) has a high proportion of carbon dioxide and hydrogen and a proportion of carbon monoxide, that is as low as possible.

Known catalysts for steam reforming of methanol are for example the metals of subgroups 8 through 10 (Fe, Ru, Os, Co, Rh, Ir, Ni, Pd, Pt). They are distinguished however by poor selectivity for the desired primary reaction and lead predominantly to a breakdown of methanol to carbon monoxide and hydrogen.

Investigations with copper catalysts exhibited high catalytic activity and selectivity in steam reforming of methanol but the known copper catalysts suffer from some serious disadvantages including their pyrophoric properties upon being exposed to oxidizing conditions and the tendency of copper to sinter at temperatures above 300° C. and in that case to lose activity.

Iwasa et al., Catalysis Letters 54 (1998), pages 119 through 123, describe further catalysts for steam reforming of methanol, in which palladium or platinum is applied as a catalytically active metal to a metal oxide carrier such as ZnO, $In_2O_3$, $Ga_2O_3$, $SiO_2$, MgO or $CeO_2$. Isawa et al. found that the catalytic activity and selectivity of palladium and platinum were markedly improved if they are applied to the carriers ZnO, $In_2O_3$ or $Ga_2O_3$. The carriers alone exhibited no reaction.

U.S. Pat. No. 6,413,449 describes a catalyst for steam reforming of methanol, which has a palladium-zinc alloy and zinc oxide as catalytically active components on a carrier material of aluminum oxide, aluminum silicate, titanium oxide, zirconium oxide, a zeolite and mixtures or mixed oxides thereof.

BRIEF SUMMARY OF THE INVENTION

The object of the present invention was to provide a catalyst for steam reforming of methanol, which in comparison with known catalysts has higher catalytic activity and/or higher selectivity for $CO_2$.

DESCRIPTION OF THE INVENTION

That object is attained by a catalyst for steam reforming of methanol, which includes a carrier material comprising a metal oxide and deposited thereon a) indium oxide ($In_2O_3$) and at least one further metal from the group of palladium (Pd), platinum (Pt), rhodium (Rh) and iridium (Ir) and/or b) an alloy comprising indium and at least one further metal from the group of palladium (Pd), platinum (Pt), rhodium (Rh) and iridium (Ir), as catalytically active substances.

DETAILED DESCRIPTION OF THE INVENTION

Figure 1:
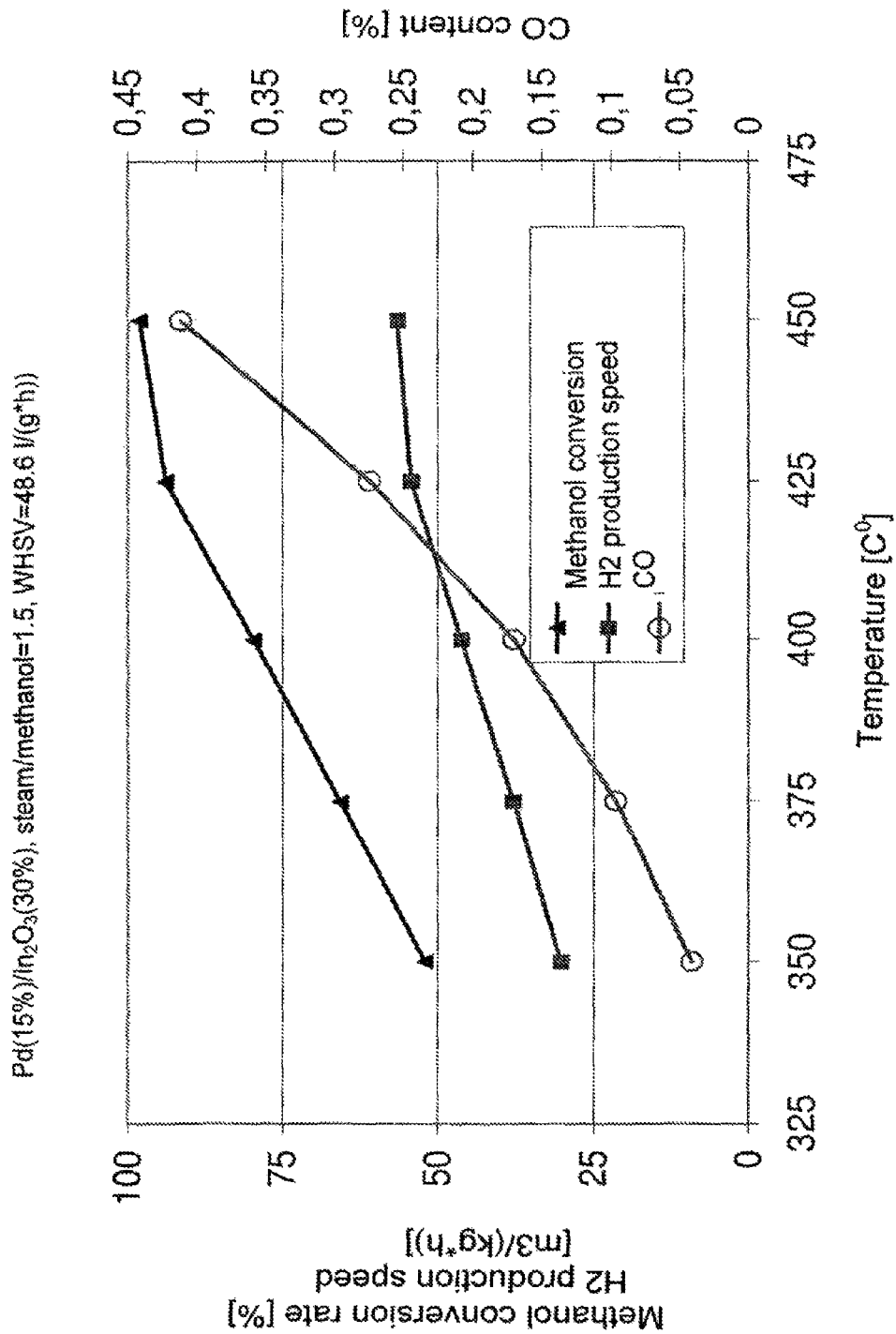
FIG. 1 is a graph showing methanol conversion to hydrogen and, carbon monoxide versus conversion temperature and hydrogen production speed versus temperature for catalyst A1, 15Pd/30 $In_2O_3$.
Figure 2:
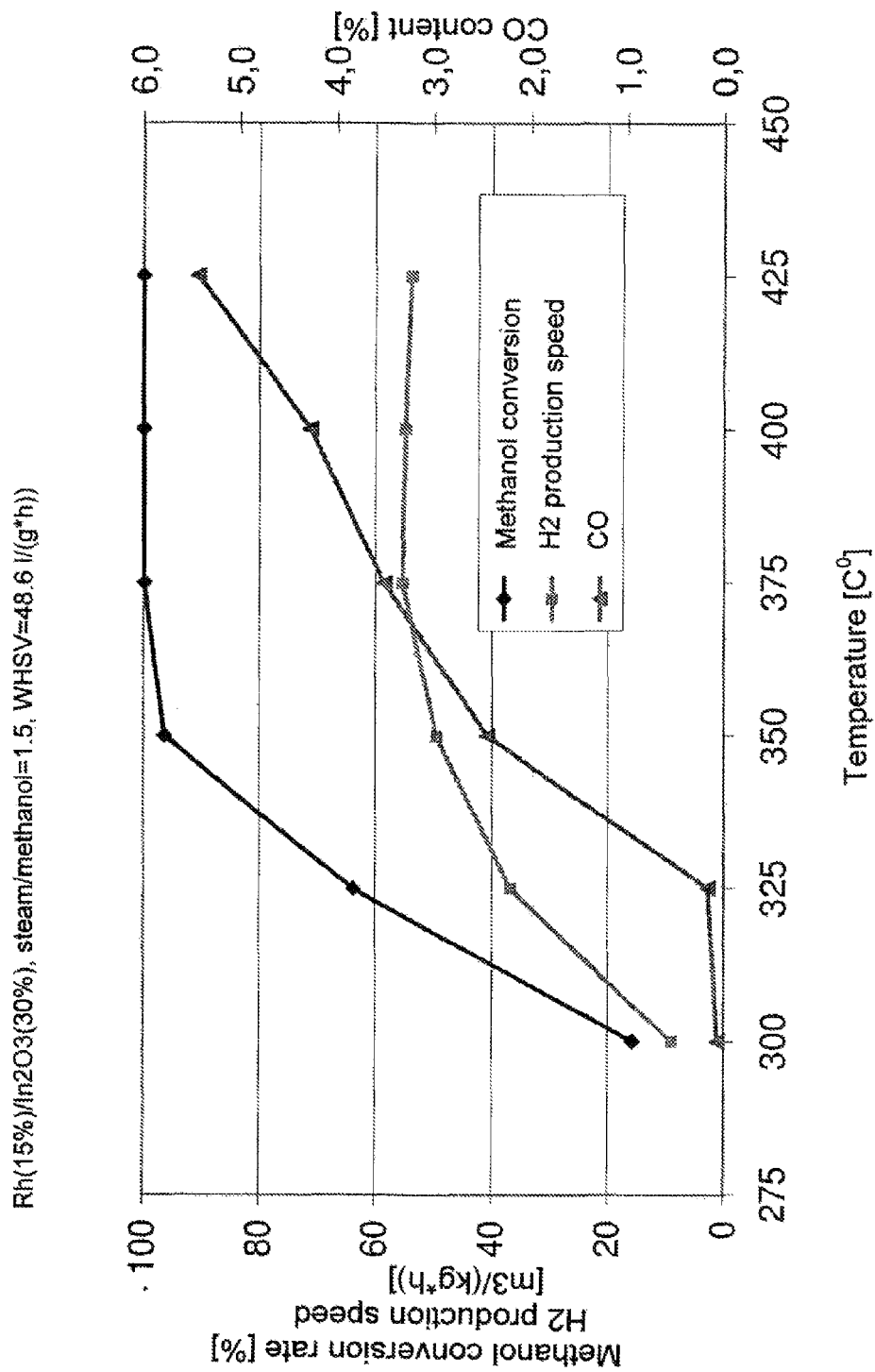
FIG. 2 is a graph showing methanol conversion to hydrogen and, carbon monoxide versus conversion temperature and hydrogen production speed versus temperature for catalyst A2, 15Rh/30 $In_2O_3$.
Figure 3:
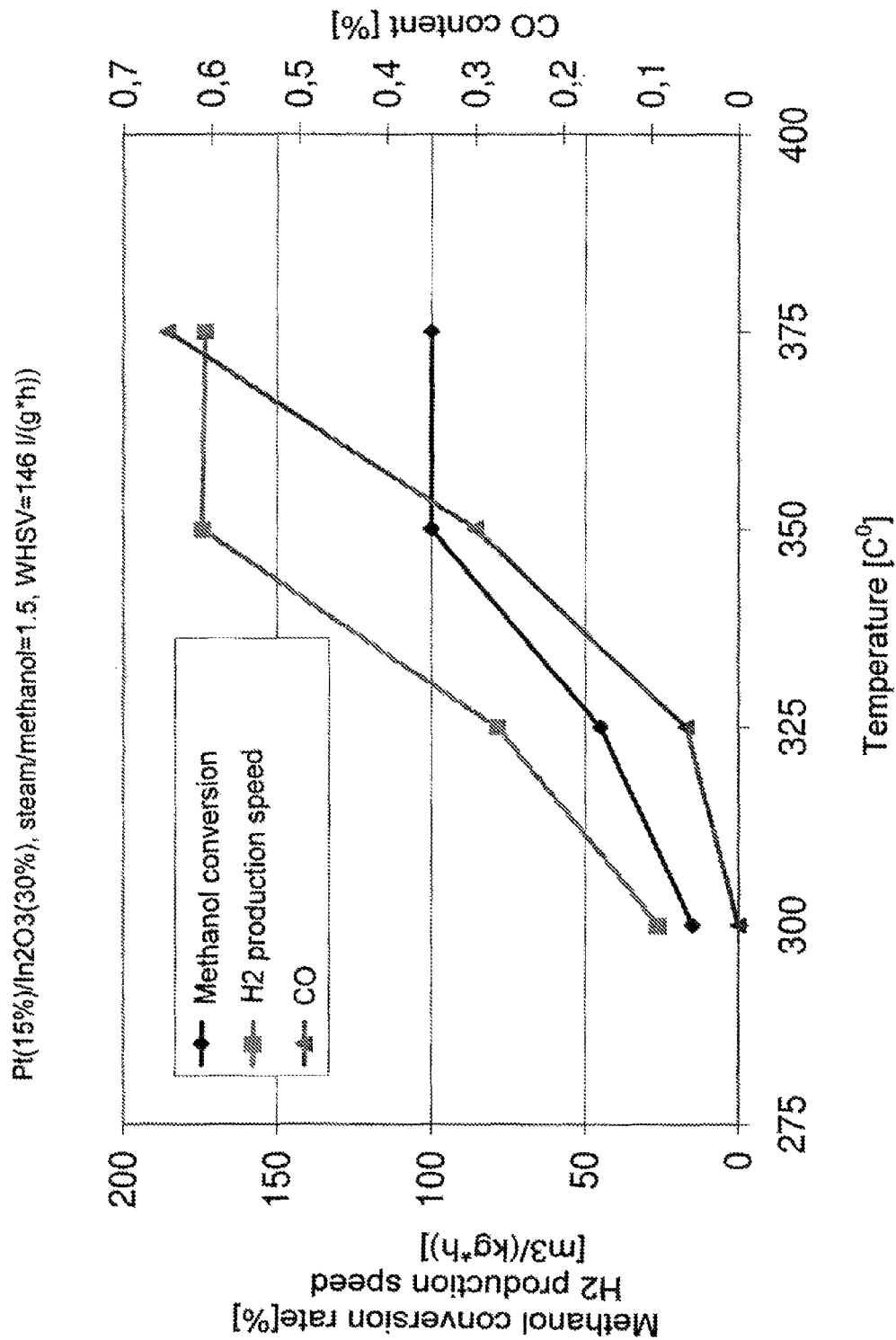
FIG. 3 is a graph showing methanol conversion to hydrogen and, carbon monoxide versus conversion temperature and hydrogen production speed versus temperature for catalyst A3, 15Pt/30 $In_2O_3$.

It was surprisingly found that a catalyst of the kind according to the invention, in comparison with known comparative catalysts, has higher catalytic activity, that is to say a higher reaction speed for the production of hydrogen and/or higher selectivity for the desired reaction product, that is to say carbon dioxide and hydrogen. By way of example the catalyst according to the invention makes it possible to achieve a hydrogen production rate which is three times higher than the catalyst of U.S. Pat. No. 6,413,449, with comparable selectivity.

After production the catalyst according to the invention is firstly present in a form in which the indium component is present in the form of indium oxide besides the further metal on the carrier material. The catalyst is ready for use in that form. X-ray diffraction investigations however made it possible to demonstrate that, when using the catalyst under reaction conditions, the indium oxide is reduced to indium metal and an alloy with the at least one further metal is produced. That alloy of indium and the further metal is also retained after use of the catalyst. It is therefore also embraced by the invention if the catalyst is firstly reduced upon or after production so that the indium oxide is already present in the commercial product in the form of indium metal in an alloy with the at least one further metal.

The present invention therefore embraces the catalyst in variant a) with indium oxide besides at least one further metal on the carrier material, and in variant b) with an alloy of indium and the at least one material on the carrier material and possible intermediate stages and mixtures thereof.

In a preferred embodiment of the invention the carrier material of the catalyst is aluminum oxide ($Al_2O_3$) which is known and frequently used as a carrier material for catalysts inter alia also because of its chemical resistance and thermal resistance. Aluminum oxide is predominantly used in the alpha and gamma modification. According to the invention the carrier material of the catalyst according to the invention is preferably aluminum oxide in the gamma modification. That modification advantageously has a particularly high specific surface area. The gamma modification of aluminum oxide is preferably produced by calcining boehmite. The carrier material of aluminum oxide in the gamma modification usually has a specific surface area of between about 200 and 220 $m^2/g$. The greater the specific surface area of the carrier material, the correspondingly more catalytically active substances can be deposited on the surface and correspondingly more reaction surface area is available for the catalytic reaction of methanol and steam.

In a further preferred embodiment of the catalyst according to the invention the further material deposited besides indium oxide or the further material deposited in an alloy with indium is palladium or platinum. Particularly high levels of catalytic activity with high specificity were achieved with those two metals.

In a further preferred embodiment of the catalyst according to the invention the ratio of the further metal (Pd, Pt, Rh or Ir) in relation to indium, expressed as the weight ratio of the further metal to indium oxide ($In_2O_3$), is in the range of between 0.2 and 1.0, preferably in the range of 0.3 and 0.8, particularly preferably in the range of 0.4 and 0.6.

When an amount, a weight or a weight ratio is specified in this application for indium (In), then, for the purposes of clear calculation, unless otherwise specified, that always relate to the weight of indium oxide ($In_2O_3$), irrespective of whether the indium in the respective case is actually in the form of indium oxide or in elementary form as indium metal or in the form of an alloy. References to a weight or a weight ratio of a further metal (M), which herein means the metals Pd, Pt, Rh or Ir, relate in contrast to the elementary weight of the respective metal.

Tests with different weight ratios between the further metal, in particular palladium or platinum, and indium oxide, with at the same time a total amount of indium oxide which is kept constant, on the carrier material, have shown that a maximum of catalytic activity and selectivity can be achieved with a ratio of about 0.5 ($M:In_2O_3=1:2$).

In particular with that weight ratio a particularly low carbon monoxide content is achieved. By way of example, with a catalyst according to the invention with a $Pd/In_2O_3$ ratio of 0.5 on a gamma-aluminum oxide carrier material, a carbon monoxide content of below 1% by volume was achieved.

In a further preferred embodiment of the catalyst according to the invention the catalyst, in relation to the total weight of the catalyst of carrier material and catalytically active substances, includes indium in an amount of between 5 and 50% by weight, preferably between 10 and 45% by weight, particularly preferably between 25 and 35% by weight, once again specified as the weight of indium oxide. Comparative tests with different loadings of catalytically active substances on the carrier material, preferably aluminum oxide, have shown in particular for palladium and platinum as further metals that the selectivity for carbon dioxide and thus minimization of carbon monoxide production can be achieved by a high loading on the carrier material with the catalytically active substances. With increasing amounts of indium, expressed as indium oxide, of between about 10% by weight and about 30% by weight on the catalyst, it was possible to observe a marked increase in selectivity for carbon dioxide and a reduction in the unwanted production of carbon monoxide. By way of example, with a catalyst according to the invention with palladium and indium oxide on an aluminum oxide carrier material, with a ratio of $Pd/In_2O_3$ of 0.5 and with a loading of the catalyst with 20% by weight $In_2O_3$, in comparison with a loading with 10% by weight of $In_2O_3$, it was possible to find a reduction in the carbon monoxide production to markedly less than half. With a loading with 30% by weight of $In_2O_3$ carbon monoxide production was reduced once again.

More appropriately the catalyst according to the invention, in relation to the total weight of the catalyst of carrier material and catalytically active substances, includes the further metal in an amount of between 5 and 25% by weight, preferably between 10 and 20% by weight, particularly preferably between 12 and 18% by weight.

In addition a catalyst suitable according to the invention, in relation to the total weight of the catalyst of carrier material and catalytically active substances, includes the carrier material in an amount of between 30 and 80% by weight, preferably between 40 and 70% by weight, particularly preferably between 50 and 60% by weight.

In comparative tests for example a catalyst comprising 55% by weight of gamma-aluminum oxide carrier material with a loading of 30% by weight of indium oxide ($In_2O_3$) and 15% by weight of palladium (Pd) has proven to be particularly advantageous. In steam reforming of methanol that catalyst exhibited very high catalytic activity and very high selectivity for carbon dioxide with at the same time a very low level of carbon monoxide production.

When reference is made to high catalytic activity and selectivity in relation to the catalyst according to the invention, it will be appreciated that this means that those details relate to the implementation of steam reforming of methanol under suitable reaction conditions, in particular at a suitable, preferably optimized reaction temperature. The appropriate reaction conditions can vary in dependence on the catalyst, the structure of the methanol reformer or reactor used and the further reaction conditions such as for example the amounts and flow speeds of methanol and steam. It is however within the capability of the man skilled in the art to set, for a predetermined catalyst, the reaction conditions of steam reforming of methanol in respect of the desired reaction speeds and levels of selectivity by suitable experiments, and to optimize same. Stipulating given reaction conditions is therefore not appropriate herein. In general the reaction temperatures in the steam reforming of methanol at the catalysts according to the invention however are in the range of between 300 and 500° C., preferably between 350 and 450° C.

The present invention also embraces the production of the catalyst according to the invention by a) applying and drying an aqueous, alcoholic or aqueous-alcoholic suspension of the metal oxide carrier material to a substrate and then calcining the metal oxide carrier material on the substrate at a temperature above 300° C., preferably above 400° C., particularly preferably above 500° C., and b) impregnating the metal oxide carrier material with solutions of indium salt and salt of the further metal, drying the salts on the metal oxide carrier material and then calcining at a temperature above 250° C., preferably above 300° C., in particular at about 350° C., for a period of more than 3 hours, preferably more than 4.5 hours, particularly preferably more than 5.5 hours.

Suitable salt solutions for impregnation of the metal oxide carrier material with indium and the further metal are for example the solutions of the nitrates of the respective metals, $H_2PtCl_6 6H_2O$ solution, but also a large number of further salt solutions which are known to the man skilled in the art or which he can find by simple tests. The salt solutions can be separately successively applied to the metal oxide carrier material, preferably however they are mixed prior to the impregnation operation and applied in the form of a mixture jointly to the metal oxide carrier material.

The present invention will now be described in greater detail hereinafter by means of Examples which however are not intended to limit the invention.

EXAMPLE 1

Production of a Catalyst System According to the Invention

Deposit of Aluminum Oxide Carrier Material on a Reactor Surface

On a laboratory scale a reactor plate provided with 14 microchannels is coated in the so-called washcoat process. The microchannels are each of a length of 2.5 cm, a width of 500 μm and a depth of 250 μm.

1st Step: Production of a Suspension of $Al_2O_3$ a) 5% by weight of binder (polyvinylalcohol PVA 40-88, FLUKA) is dissolved in 74% by weight of deionized $H_2O$ with agitation at 65° C. for three hours and then left to stand overnight without agitation.

b) 20% by weight of $Al_2O_3$ and 1% by weight of concentrated acetic acid are added and the mixture is agitated once again for three hours at 65° C. The mixture is then agitated for a further three days at ambient temperature until a homogenous suspension is obtained.

A variation in the quantitative ratios of the binder solution to $Al_2O_3$ suspension makes it possible to adjust or influence the thickness which is later achieved in respect of the aluminum oxide layer on the reactor surface.

2nd Step: Applying the Suspension to the Surface of the Microchannels

Firstly regions of the reactor surface, that are not to be coated, are masked or covered and the suspension is then applied to the channels. Excess solution is removed.

3rd Step: Drying and Calcining the Coatings

After application of the suspension to the surfaces of the microchannels the samples are dried in air and then calcined in a furnace with the following temperature program:
heating in 120 minutes to 120° C.,
holding for 120 minutes at 120° C.,
heating in 300 minutes to 600° C., and
holding for 120 minutes at 600° C.

The amount of the $Al_2O_3$ coating is determined on the basis of the weight of the coated plate. The composition of the impregnation solution is established on the basis of that value.

Impregnating the Aluminum Oxide Carrier Material with Catalytically Active Substances In the case of the previously implemented deposit of aluminum oxide on the reactor surface the deposited amount of aluminum oxide is usually in the range of between 7.5 and 10 mg or between 0.021 mg/mm$^2$ and 0.057 mg/mm$^2$. A suitable fluid volume for impregnation of the type of plate used with the produced deposited amount of aluminum oxide is about 20 μl. The levels of concentration of the salts of indium and further metal, for example platinum or palladium, which are to be applied by impregnation are adjusted in accordance with the desired weight ratio and the desired loading of the finished catalyst having regard to the aforementioned amount of impregnation solution to be used of about 20 μl. The amount of impregnation solution is then uniformly applied to the aluminum oxide coating on the reactor surface.

For example aqueous solutions of indium (III)-nitrate hydrate and palladium nitrate or hexachloroplatinic acid hexahydrate are used as impregnating solutions.

After the impregnation operation the plates are firstly dried in air at ambient temperature and then calcined with the following temperature program:
heating in 120 minutes to 120° C.,
holding for 120 minutes at 120° C.,
heating in 120 minutes to 350° C., and
holding for 360 minutes at 350° C.

After the calcining operation the plates are weighed again to check the applied loading of the carrier material with catalytically active substances.

EXAMPLE 2

Steam Reforming of Methanol

Catalysts according to the invention were produced in accordance with Example 1 on gamma-aluminum oxide carrier material on corresponding reactor plates. Tests of steam reforming of methanol were implemented with the catalysts according to the invention on the reactor plates. The results are reproduced in Tables 1 and 2 hereinafter and in FIGS. 1 through 4. The molar ratio of steam to methanol in the supplied methanol-steam mixture [S/C], the weight hourly space velocity [WHSV] and temperature are specified as test parameters.

Figure 4:
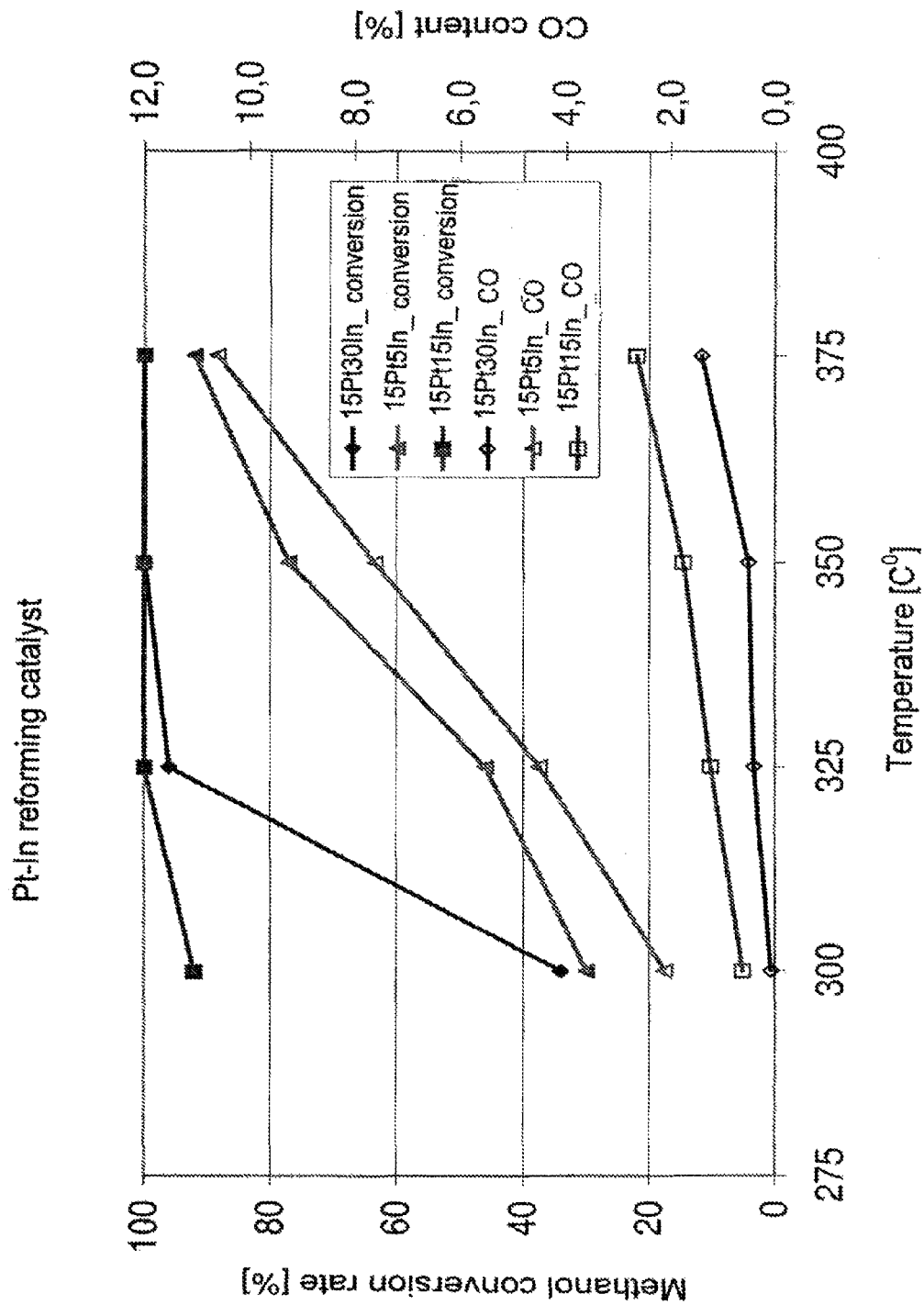
FIG. 4 is a graph showing methanol conversion rate and CO production versus temperature for catalysts B1, 15Pt/30$In_2O_3$: B2 15Pt/5 $In_2O_3$; and B3, 15Pt/15 $In_2O_3$.

Catalysts used:
(A1) 15 Pd/30 $In_2O_3$ (FIG. 1)
(A2) 15 Rh/30 $In_2O_3$ (FIG. 2)
(A3) 15 Pt/30 $In_2O_3$ (FIG. 3)
(B1) 15 Pt/30 $In_2O_3$ (FIG. 4)
(B2) 15 Pt/5 $In_2O_3$ (FIG. 4)
(B3) 15 Pt/15 $In_2O_3$ (FIG. 4)

The numbers preceding the respective catalytically active substance (Pt, Rh and $In_2O_3$) denote percent by weight of the respective substance of the overall weight of the catalyst consisting of carrier material and catalytically active substances.

TABLE 1

| Catalyst | Steam/ methanol [S/C] | WHSV [l/(g h)] | Temperature [° C.] | $H_2$ prod. speed [m³/ (kg h)] | CO content [%] | Methanol conversion [%] |
| --- | --- | --- | --- | --- | --- | --- |
| A1: 15Pd30In2O3 | 1.5 | 48.6 | 350 | 30.3 | 0.04 | 52.0 |
| | 1.5 | 48.6 | 375 | 37.9 | 0.1 | 65.6 |
| | 1.5 | 48.6 | 400 | 46.2 | 0.17 | 79.6 |
| | 1.5 | 48.6 | 425 | 54.2 | 0.27 | 93.9 |
| | 1.5 | 48.6 | 450 | 56.4 | 0.41 | 98.1 |
| A2: 15Rh30In2O3 | 1.5 | 48.6 | 300 | 9.1 | 0.06 | 15.7 |
| | 1.5 | 48.6 | 325 | 37.1 | 0.16 | 63.7 |
| | 1.5 | 48.6 | 350 | 54 | 2.45 | 96.3 |
| | 1.5 | 48.6 | 375 | 55.4 | 3.5 | 99.8 |
| | 1.5 | 48.6 | 400 | 54.9 | 4.3 | 99.9 |
| | 1.5 | 48.6 | 425 | 53.9 | 5.4 | 99.9 |
| A3: 15Pt30In2O3 | 1.5 | 146 | 300 | 26.3 | 0.02 | 15.0 |
| | 1.5 | 146 | 325 | 78.6 | 0.06 | 45.0 |
| | 1.5 | 146 | 350 | 174 | 0.3 | 100 |
| | 1.5 | 146 | 375 | 174 | 0.65 | 100 |
| | 1.5 | 195 | 375 | 230 | 0.6 | 100 |

TABLE 2

| Catalyst | Steam/ methanol [S/C] | WHSV [l/(g h)] | Temperature [° C.] | $H_2$ prod. speed [m³/(kg h)] | CO content [%] | Methanol conversion [%] |
| --- | --- | --- | --- | --- | --- | --- |
| B1: 15Pt30In2O3 | 1.5 | 48.6 | 300 | 19.8 | 0.07 | 34.0 |
| | 1.5 | 48.6 | 325 | 55.7 | 0.4 | 96.0 |
| | 1.5 | 48.6 | 350 | 57.9 | 0.5 | 100 |
| | 1.5 | 48.6 | 375 | 57.0 | 1.4 | 100 |
| B2: 15Pt5In2O3 | 1.5 | 48.6 | 300 | 15.9 | 2.1 | 30.0 |
| | 1.5 | 48.6 | 325 | 23.7 | 4.5 | 46.0 |
| | 1.5 | 48.6 | 350 | 39.0 | 7.6 | 77.0 |
| | 1.5 | 48.6 | 375 | 44.4 | 10.6 | 92.0 |
| B3: 15Pt5In2O3 | 1.5 | 48.6 | 300 | 52.6 | 0.6 | 92.0 |
| | 1.5 | 48.6 | 325 | 57.7 | 1.2 | 100 |
| | 1.5 | 48.6 | 350 | 56.8 | 1.8 | 100 |
| | 1.5 | 48.6 | 375 | 56.6 | 1.8 | 100 |

The results of the tests show that the optimum reaction temperature for each catalyst can be somewhat different, wherein the optimum ratio of catalytic activity to selectivity for carbon dioxide (minimizing carbon monoxide formation) can be ascertained by simple measurement series. With a methanol conversion of 100% an increase in hydrogen production on the basis of complete educt consumption is only still possible by increasing the amount of supplied steam-methanol mixture per unit of time.

The comparative tests with the catalysts B1, B2 and B3 as shown in FIG. 4 show that, with a ratio of platinum to indium, expressed as the weight ratio of platinum to indium oxide, of about 0.5 and an amount of 30% by weight of indium, also expressed as indium oxide, as from a reaction temperature of about 325° C., maximization of catalytic activity, measured against the methanol conversion, with at the same time extremely high selectivity, specified as a very low carbon monoxide content, is achieved. With a weight ratio of platinum to indium, expressed as indium oxide, of 1.0 and a lower indium content of 15% by weight, that also achieves very high catalytic activity, but with at the same time somewhat worse selectivity for carbon dioxide, expressed as a higher content of carbon monoxide produced. Upon a further reduction in the indium content in the catalyst the high catalytic activity achieved with the aforementioned catalysts is no longer attained at all, at best it is only at the high temperature of 375° C. that a methanol conversion of about 90% is achieved. The selectivity of that combination is markedly worse generally over the entire tested temperature range than in the case of the aforementioned catalysts and worsens with increasing temperature while methanol conversion increases.

The invention claimed is:

1. A method for steam reformation of methanol comprising reforming the methanol over a catalyst which includes a carrier material comprising a metal oxide and directly depositing thereon a layer consisting essentially of:
   a) indium oxide ($In_2O_3$) and at least one further metal from the group of palladium (Pd), platinum (Pt), rhodium (Rh) and iridium (Ir) and/or
   b) an alloy comprising indium and at least one further metal from the group of palladium (Pd), platinum (Pt), rhodium (Rh) and iridium (Ir), as catalytically active substances,
   wherein the ratio of the further metal (Pd, Pt, Rh or Ir) in relation to indium, expressed as the weight ratio of the further metal to indium oxide ($In_2O_3$), is in the range of between 0.2 and 1.0, and wherein the catalyst, in relation to the total weight of the catalyst of carrier material and catalytically active substances, includes indium, expressed as indium oxide ($In_2O_3$) in an amount of between 5 and 50% by weight.

2. A method as set forth in claim 1 wherein the carrier material is aluminum oxide ($Al_2O_3$).

3. The method of claim 2 wherein the aluminum oxide is in a gamma form.

4. The method of claim 2 where the aluminum oxide has a specific surface area of 200 - 220 $m^2/g$.

5. A method as set forth in claim 1 wherein the further metal deposited besides indium oxide or the further metal deposited in an alloy with indium, is palladium or platinum.

6. The method as set forth in claim 1 wherein the ratio of the further metal (Pd, Pt, Rh or Ir) in relation to indium, expressed as the weight ratio of the further metal to indium oxide ($In_2O_3$), is in the range of between 0.4 and 0.6.

7. The method as set forth in claim 1 wherein the catalyst, in relation to the total weight of the catalyst of carrier material and catalytically active substances, includes indium, expressed as indium oxide ($In_2O_3$) in an amount of between 25 and 35% by weight.

8. A method as set forth in claim 1 wherein the catalyst, in relation to the total weight of the catalyst of carrier material and catalytically active substances, includes the further metal in an amount of between 5 and 25% by weight.

9. The method as set forth in claim 8 wherein the catalyst, in relation to the total weight of the catalyst of carrier material and catalytically active substances, includes the further metal in an amount of between 12 and 18% by weight.

10. The method of claim 1 further comprising preparing the catalyst by the steps of:
   a) applying and drying an aqueous, alcoholic or aqueous-alcoholic suspension of the metal oxide carrier material to a substrate and then calcining the metal oxide carrier material on the substrate at a temperature above 300° C., and
   b) impregnating the metal oxide carrier material with solutions of indium salt and salt of the further metal, drying the salts on the metal oxide carrier material and then calcining at a temperature above 250° C. for a period of more than 3 hours.

\* \* \* \* \*